(12) United States Patent
Bell et al.

(10) Patent No.: US 11,958,785 B2
(45) Date of Patent: Apr. 16, 2024

(54) BONDING SCINTILLATOR MATERIAL TO PRODUCE LARGE PANELS OR OTHER SHAPES

(71) Applicant: RAYTHEON COMPANY, Waltham, MA (US)

(72) Inventors: Stephanie Silberstein Bell, North Andover, MA (US); Thomas M. Hartnett, Nashua, NH (US); Richard Gentilman, Acton, MA (US); Derrick J. Rockosi, Lynn, MA (US); Jeremy Wagner, Brighton, MA (US)

(73) Assignee: RAYTHEON COMPANY, Waltham, MA (US)

( * ) Notice: Subject to any disclaimer, the term of this patent is extended or adjusted under 35 U.S.C. 154(b) by 1191 days.

(21) Appl. No.: 16/680,602

(22) Filed: Nov. 12, 2019

(65) Prior Publication Data
US 2021/0139383 A1    May 13, 2021

(51) Int. Cl.
| C04B 37/00 | (2006.01) |
| C04B 35/01 | (2006.01) |
| C04B 35/44 | (2006.01) |
| C04B 35/645 | (2006.01) |
| C09K 11/08 | (2006.01) |

(Continued)

(52) U.S. Cl.
CPC .......... *C04B 37/003* (2013.01); *C04B 37/005* (2013.01); *C09K 11/08* (2013.01); *C04B 2235/764* (2013.01); *C04B 2237/10* (2013.01); *C04B 2237/34* (2013.01)

(58) Field of Classification Search
None
See application file for complete search history.

(56) References Cited

U.S. PATENT DOCUMENTS

| 4,973,564 A | 11/1990 | Chyung et al. |
| 10,000,698 B2 | 6/2018 | Cherepy et al. |
| 2006/0100088 A1 | 5/2006 | Loureiro et al. |

(Continued)

FOREIGN PATENT DOCUMENTS

| CN | 102782082 A | * 11/2012 | ............... C03C 8/08 |
| CN | 104276818 A | * 1/2015 | |

(Continued)

OTHER PUBLICATIONS

Walls et al., "Mechanical Properties of β-SiAlON Ceramics joined using Composite β-SiAlON-Glass adhesive," Journal of the American Ceramic Society, vo. 78(4), pp. 999-1005 (1995) (Year: 1995).*

(Continued)

*Primary Examiner* — Randy P Gulakowski
*Assistant Examiner* — Ha S Nguyen
(74) *Attorney, Agent, or Firm* — CANTOR COLBURN LLP

(57) ABSTRACT

A method of bonding includes applying a glass composition to at least a first material surface. The glass composition includes a glass powder and a solvent. The first material surface is disposed onto a second material surface. An elevated temperature is applied to the first material surface and the second material surface to form a bond between the first material surface and the second material surface. The first material surface and the second material surface are compressed under an isostatic pressure.

6 Claims, 3 Drawing Sheets

(51) Int. Cl.
*C09K 11/77* (2006.01)
*G21K 4/00* (2006.01)

(56) References Cited

U.S. PATENT DOCUMENTS

| 2007/0079936 | A1 | 4/2007 | Li et al. |
| 2010/0116308 | A1* | 5/2010 | Hayashi ............... H10N 10/855 |
| | | | 156/89.12 |
| 2010/0294939 | A1 | 11/2010 | Kuntz et al. |
| 2012/0225767 | A1* | 9/2012 | Imholt .................. C04B 35/44 |
| | | | 264/1.21 |
| 2017/0260448 | A1 | 9/2017 | Cherepy et al. |
| 2021/0139773 | A1 | 5/2021 | Bell et al. |

FOREIGN PATENT DOCUMENTS

| DE | 102009047581 A1 * | 6/2011 | ............ C03C 27/06 |
| EP | 0294176 A2 | 12/1988 | |
| JP | 2015086118 A | 5/2015 | |
| WO | 2015176793 A1 | 11/2015 | |
| WO | 2017214464 A1 | 12/2017 | |

OTHER PUBLICATIONS

Walls et al., "Joining SiAlON Ceramics Using Composite β-SiAlON-Glass Adhesives," Journal of the American Ceramic Society, vo. 75(9), pp. 2491-2497 (1992) (Year: 1992).*

Wang et al., "Effect of thermal annealing on scintillation properties of Ce:Gd2Y1Ga2.7Al2.3O12 under different atmosphere", Applied Physics, 2017, pp. 1-6.

Chen et al., "Fabrication of Ce: (Gd2Y) (Ga3Al2) 012scintillator ceramic by oxygen-atmosphere sintering and hot sostatic pressing", Journal of the European Ceramic Society, Elsevier Science Publishers, Barking, Essex, GB, vol. 37, No. 10, Apr. 10, 2017, pp. 3411-3415, XP029989813.

Notification of Transmittal of the International Search Report and the Written Opinion of the International Searching Authority, or the Declaration PCT/US2020/050149, dated Nov. 19, 2020, International filing date: Sep. 10, 2020, pp. 1-14.

Notification of Transmittal of the International Search Report and the Written Opinion of the International Searching Authority, or the Declaration PCT/US2020/050151, dated Nov. 23, 2020, International filing date: Sep. 10, 2020, pp. 1-36.

Seeley et al., "Homogeneity of Gd-based garnet transparent ceramic scintillators for gamma spectroscopy", Journal of Crystal Growth, Elsevier, vol. 379, Nov. 28, 2012, pp. 79-83, XP028682360.

International Preliminary Report on Patentability PCT/US2020/050149, dated May 17, 2022, 6 pages.

International Preliminary Report on Patentability PCT/US2020/050151, dated May 17, 2022, 7 pages.

Kanai et al., "Hot-Pressing Method to Consolidate Gd3(Al,Ga)5O12:Ce Garnet Scintillator Powder for use in an X-ray CT Detector", International Journal of Applied Ceramic Technology, 10[S1], E1-E10 (2013).

* cited by examiner

BONDING SCINTILLATOR MATERIAL TO PRODUCE LARGE PANELS OR OTHER SHAPES

GOVERNMENT LICENSE RIGHTS

This invention was made with Government support under HDTRA1-12-C-0040 awarded by the Department of Defense. The Government has certain rights in the invention.

BACKGROUND

The present disclosure relates to bonding, and more specifically, to bonding scintillator material to produce large panels or other shapes.

A scintillator material emits light, or luminesces, when excited by ionizing radiation. When an incoming particle strikes such a material, the material absorbs the energy of the particle and scintillates, or re-emits the absorbed energy as light.

A scintillation detector or scintillation counter includes a scintillator material coupled to an electronic light sensor, such as a photomultiplier tube (PMT), photodiode, or silicon photomultiplier. PMTs absorb the light emitted by the scintillator and re-emit the light in the form of electrons via the photoelectric effect. The subsequent multiplication of the electrons results in an electrical pulse that can be analyzed and yield meaningful information about the particle that originally struck the scintillator.

Scintillators are used in a variety of applications, such as radiation detectors, particle detectors, new energy resource exploration, X-ray security, nuclear cameras, computed tomography, and gas exploration. Other applications of scintillators include computerized tomography (CT) scanners and gamma cameras in medical diagnostics.

SUMMARY

According to one or more embodiments of the present invention, a method of bonding includes applying a glass composition to at least a first material surface. The glass composition includes a glass powder and a solvent. The first material surface is disposed onto a second material surface. An elevated temperature is applied to the first material surface and the second material surface to form a bond between the first material surface and the second material surface. The first material surface and the second material surface are compressed under an isostatic pressure.

According to other embodiments of the present invention, a method of bonding includes applying a glass composition to at least a first material surface. The glass composition includes a glass powder and a solvent. The solvent is removed from the glass composition by applying a first elevated temperature. The first material surface is disposed onto a second material surface. A second elevated temperature is applied to the first material surface and the second material surface to form a bond between the first material surface and the second material surface. The first material surface and the second material surface are pressed under an isostatic pressure.

Yet, according to some embodiments of the present invention, a scintillator material includes a bond arranged between a first scintillator material surface and a second scintillator material surface. The bond includes a glass and is optically transparent.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
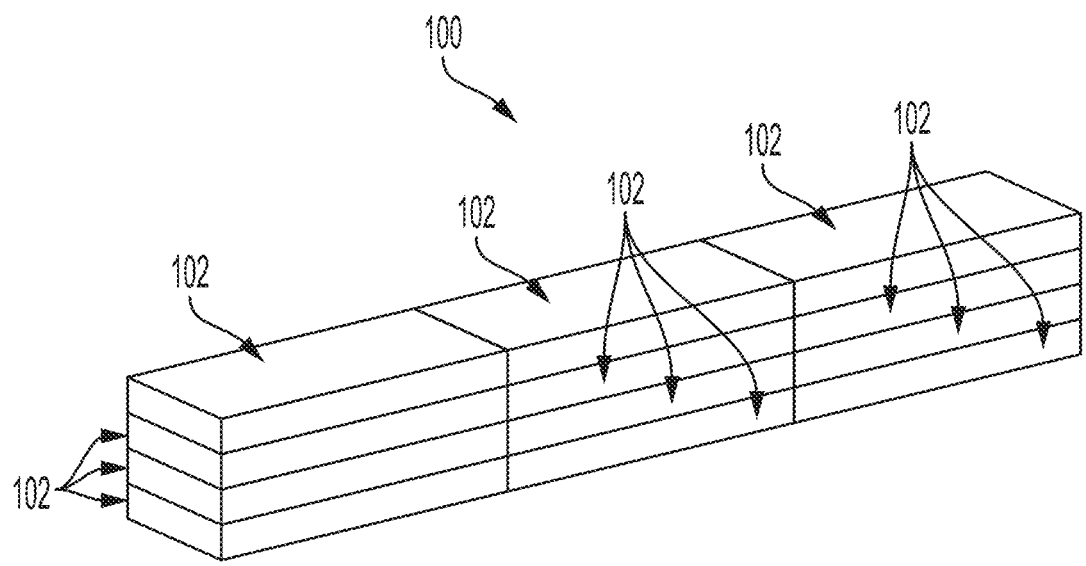
FIG. 1 is a perspective view of a plurality of ceramic tiles bonded together according to embodiments of the present invention.

For the sake of brevity, conventional techniques related to ceramic material processing and bonding may or may not be described in detail herein. Moreover, the various tasks and process steps described herein can be incorporated into a more comprehensive procedure or process having additional steps or functionality not described in detail herein.

Turning now to an overview of technologies that are more specifically relevant to aspects of the invention, radiation detection uses large panels of scintillator materials. Large scintillator panels are typically formed by bonding smaller panels or tiles of ceramic (e.g., garnet-based materials) or single-crystal materials. Diffusion bonding is a solid-state type of bonding used to form large scintillator panels. Diffusion bonding operates on the principle of solid-state diffusion in which the atoms of two solid surfaces intersperse themselves over time. Diffusion bonding typically includes applying an elevated temperature in conjunction with high pressure and/or atomically polished flat surfaces to bond the materials together and form sufficiently large panels. Diffusion bonding of smaller panels or blocks of ceramic or single crystal includes polishing the surfaces to be bonded to a high degree of flatness (at least about $1/10\lambda$) and low degree of roughness (about 10 Ångstroms). The surfaces are then optically contacted and heat treated to form a strong bond. However, diffusion bonding is both expensive and time consuming.

Glass bonding is another method that can be used to bond scintillator materials or surfaces. Glass bonding, also referred to as glass frit bonding, includes using an intermediate glass layer to bond two surfaces together. However, forming a bond that is free of crystallites and bubbles, which impact the optical quality of the bond, is challenging and can require special techniques and materials.

Turning now to an overview of the aspects of the invention, one or more embodiments of the invention address the above-described shortcomings of the prior art by providing a cost-effective and faster process for bonding small material surfaces of scintillator material to form large panels that can be used for radiation detection systems. The glass bonding processes includes low temperature vehicle removal, single higher temperature bonding, and hot isostatic pressing (HIPing). The bonding processes can be used to bond ceramic tiles, for example, garnet-based materials, or single-crystal materials.

The above-described aspects of the invention address the shortcomings of the prior art by providing cheaper and faster methods for bonding tiles of ceramic material to form large scintillator panels. The bonding process mitigates crystallite and bubble formation, which affects the optical quality of the bond. An optically transparent bond is formed between scintillator material surfaces. The bonding processes therefore provide a transparent bond between optical material tiles, such as ceramic tiles.

Turning now to a more detailed description of aspects of the present invention, embodiments of the present invention are directed to methods and resulting structures for bonding ceramic tiles or panels, single crystal materials, or other scintillator material surfaces to form large panels that can be used as scintillator materials in radiation detection systems. Although the below methods are described with particular reference to ceramic based materials, such as garnet-based materials, and bonding for forming large scintillator panels, the methods are applicable to any scintillator material.

FIG. 1 is a perspective view of a plurality of ceramic tiles 102 (also referred to as panels or scintillator material surfaces) bonded together to form a large panel 100 according to embodiments of the present invention. The individual ceramic tiles 102 shown in FIG. 1 are for illustrative purposes only and are not limited to the shape shown. The ceramic tiles 102 can each have any shape, size, and/or dimensions, which depend on the desired application, detector, and system size and design.

According to one or more embodiments of the present invention, each ceramic tile 102 has a length (l) of about 1 to about 12 centimeters (cm), a width (w) of about 1 to about 5 cm, and a thickness (t) of about 0.1 to about 1.25 cm. Large ceramic panels can be made in sizes up to about 1 meter (m)×1 m×1 inch thickness, which can then be glass frit bonded to make even larger thicker panels. One of the benefits of the glass frit bonding process is that monolithic large and expensive panels do not have to be fabricated at all, as large panels can be made from smaller components.

According to other embodiments of the present invention, the ceramic tile 102 has a length (l) of about 0.5 to about 1.5 cm, a width (w) of about 0.5 to about 1.5 cm, and a thickness (t) of about 0.5 to about 1.5 cm. According to one or more exemplary embodiments, small ceramic or single crystal blocks having dimensions of 1 cm×1 cm×1 cm can also be bonded using the disclosed glass frit bonding process. The number of bonding operations is increased and the potential for bond line defects increases. The size of the individual blocks needed should be scaled to the size of the required end use component to minimize the costs associated with assembly and the costs of scaling the individual block size to minimize the number of bond lines.

The ceramic tiles 102 are glass bonded together as described herein to form the large panel 100. Individual ceramic tiles 102 are bonded end-to-end, and/or face-to-face as shown in FIG. 1. Any number of ceramic tiles 102 can be bonded together. For example, two or more ceramic tiles 102, or a plurality of ceramic tiles 102 can be bonded together to form the large panel 100.

The ceramic tiles 102 are optically transparent materials. According to some embodiments of the present invention, the ceramic tiles 102 include garnet-based materials, for example, yttrium aluminum garnet (YAG) ($Y_3Al_5O_{12}$), gadolinium gallium garnet (GGG) ($Gd_3Ga_5O_{12}$), or a combination thereof. In some embodiments of the present invention, the ceramic tiles 102 include cerium doped gadolinium gallium garnet (GGG) mixed with yttrium aluminum garnet (YAG) to form a GYGAG:Ce material.

The ceramic tiles 102 are not limited to garnet-based materials, however. In exemplary embodiments of the present invention, the ceramic tiles 102 include a garnet-based material with the formula $(Gd_{3-x-z}Y_x)\,Ce_z(Ga_{5-y}Al_y)\,O_{12}$, where x is about 0 to about 2, y is about 0 to about 5, and z is about 0.001 to about 1.0. According to one or more embodiments of the present invention, the garnet-based material includes a compound with the formula $Gd_{1.495}Y_{1.5}Ce_{0.005}Ga_{2.5}Al_{2.5}O_{12}$. In other embodiments of the present invention, the garnet-based material includes a cerium dopant concentration in an amount of about 0.001 to about 1.0 per the formula $(Gd_{3-x-z}Y_x)\,Ce_z(Ga_{5-y}Al_y)\,O_{12}$.

Figure 2:
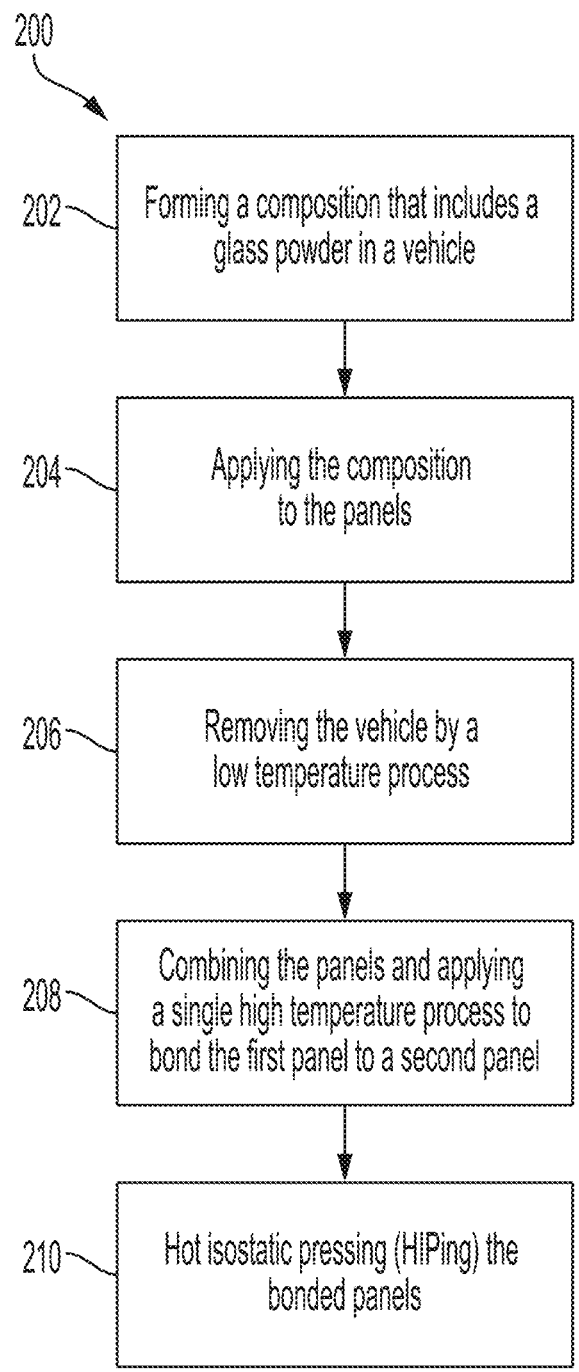
FIG. 2 is a flow chart illustrating a method for bonding ceramic tiles according to embodiments of the present invention.

FIG. 2 is a flow chart illustrating a method 200 for bonding ceramic tiles (or scintillator material surfaces) according to embodiments of the present invention. As shown in box 202, the method 200 includes forming a composition that includes a glass frit powder in a vehicle. The composition is in the form of a slurry, paste, or other mixture to facilitate the application to the surfaces of the parts to be bonded. The glass frit powder may also include inorganic additives to modify the refractive index of the base frit composition to best match the scintillator block (panel or sub panel) (e.g., $SiO_2$, $B_2O_3$, $Y_2O_3$, $Gd_2O_3$, $Al_2O_3$, $Na_2O$, $K_2O$ $CeO_2$ etc.).

The powder includes a material such as glass with a refractive index (RI, n) that matches the ceramic tiles to be bonded. The refractive index of the glass powder used for glass bonding has a refractive index within 0.01 to about 0.04% of the refractive index, n, of the ceramic tiles to be bonded. The difference in refractive index between the glass bonding material and the scintillator material should be within the range of delta n=0.001 to 0.200 in the wavelength range (e.g., visible light of about 380 nm to about 740 nm) of interest to minimize reflection losses at the bond interface.

A non-limiting example of a glass powder includes lead silicate glass. Another non-limiting example of a powder is N-SF57 glass, which is commercially available from SCHOTT AG. Other non-limiting examples of glass frit powders include SF57, NLAK8, LASF40, and LASF60. Delta n is referenced to YAG, $Y_3Al_5O_{12}$.

The Table below provides of some examples of commercial glass frit materials that can be used to bond scintillator panels to make a larger block.

| Glass | Density | n (566.1 nm) | Δn(YAG) |
| --- | --- | --- | --- |
| N-LASF40 | 4.43 | 1.83404 | −0.0006 |
| SF57 | 5.51 | 1.85504 | 0.0204 |
| NLAK 8 | 3.75 | 1.71616 | −0.11848 |
| S-LAH60 | 4.43 | 1.83932 | 0.004683 |
| YAG | 4.55 | 1.83464 | 0 |

The glass powder can be processed, for example by milling, to provide the desired size, for example, nano-sized or micron-sized dimensions. In some approaches, the glass powder has a mean particle diameter in a range from about 500 nm to about 10,000 nm.

The glass powder is combined with a vehicle, and optionally, one or more additives, such as a polymer, to form the ceramic composition. The vehicle includes a solvent, a polymer, or a combination thereof. A non-limiting example of a solvent for the vehicle includes isopropyl alcohol. Non-limiting examples of polymers include butoxyethoxy ethyl acetate, butoxyethoxy ethanol, elvacite 2045 acrylic resin, or a combination thereof.

The glass composition is in the form of, for example, a slurry or a paste. The solids content of the composition is about 10% to about 90% by weight according to some embodiments of the present invention. The solids content of the composition is about 45% to about 60% by weight according to some other embodiments of the present invention.

As shown in box 204, the method 200 includes applying the composition to the panels. The ceramic composition is applied to at least the first panel to be bonded to a second panel. In some approaches, the composition is applied to both the first panel and the second panel. The composition is applied by various methods, which depends on the type of composition used for bonding. Non-limiting examples of methods for applying the bonding composition to at least one panel includes brush application, spray-coating, screen-printing, or a combination thereof.

According to some embodiments of the present invention, glass, in fit form, is mixed into a slurry and applied with a spray gun. According to other embodiments of the present invention, glass, in frit form, is mixed into a paste and spread onto the surface of the panels through a stencil with a doctor blade (also referred to as screen-printing).

As shown in box 206, the method 200 includes removing the vehicle by a low temperature process. Instead of using a conventional high temperature vehicle burn-off process, a lower but elevated temperature is used. The panels remain separate from one another during the vehicle removal process.

The low temperature process is about 100 to about 500° C. according to some embodiments of the present invention. The low temperature process is about 100 to about 200° C. according to some other embodiments of the present invention.

As shown in box 208, the method 200 includes combining the panels and applying a single high temperature process to bond the first panel to a second panel. The glass frit is applied to all surfaces of the scintillator panels, and then the scintillator panels are arranged in contact with each other to form a larger panel. The combined panels are then heat treated to melt the glass frit and form a bond between the assembled panels.

The high temperature bonding process is performed at a temperature of about 400 to about 1000° C. according to some embodiments of the present invention. The high temperature bonding process is performed at a temperature of about 500 to about 800° C. according to some other embodiments of the present invention. The bonding temperature is determined relative to the softening point of the glass composition; bonding temperature is typically 100 to 200° C. above the softening point of the glass.

The high temperature bonding process is very brief, and performed for a time of about 30 minutes to about 10 hours according to some embodiments of the present invention. The high temperature bonding process is performed for a time of about 1 hour to about 2 hours according to some embodiments of the present invention.

As shown in box 210, the method 200 includes hot isostatic pressing (HIPing) the bonded panels. The HIPing process eliminates bubbles between the bonded panels by applying an increased temperature and isostatic pressure. The remaining pores in the bond are closed so that the glass bond between the panels becomes essentially transparent, with low scatter.

According to one or more embodiments of the present invention, hot isostatic pressing is performed under an isostatic pressure of about 5,000 psi to about 30,000 psi. According to some embodiments of the present invention, hot isostatic pressing is performed at a temperature of about 400 to about 1300° C.

The hot isostatic pressing is performed at a temperature of about 400 to about 1300° C. according to some embodiments of the present invention. The hot isostatic process is performed at a temperature of about 500 to about 900° C. according to some other embodiments of the present invention.

The hot isostatic pressing is performed for a time of about 30 minutes to about 10 hours according to some embodiments of the present invention. The hot isostatic pressing is performed for a time of about 30 minutes to about 4 hours according to some embodiments of the present invention.

The above described glass bonding methods provide and maintain an optically transparent bond, which is free of crystallites and bubbles that form at the interface between the panels. In particular, the hot isostatic pressing process is used to eliminate bubbles and other flaws, which is different from conventional glass bonding processes. The above processes are suitable for bonding ceramic materials together, such as GYGAG scintillator materials. Glass bonding as described provides a cheaper and more efficient method to bond ceramic materials together.

Unexpectedly, some ceramic materials, such as garnet based materials with heavier elements than Ce doped YAG (cerium doped yttrium aluminum garnet) (e.g., GYGAG materials) form bubbles and crystallites at the bonding interface. However, the above processing steps are tailored to mitigate such flaws, which affect optical transparency of the bond. By applying the above described processing steps, bubbles and crystallites that typically form (and impact the optical quality of the bond) are eliminated. Bubbles and crystallites are detrimental to the optical quality of a bond because they both possess refractive indices different from that of the glass bonding layer. For example, in the case of a bubble, the refractive index is 1, or the refractive index of air. These defects cause undesired light scattering through the bond.

GYGAG (gadolinium yttrium gallium aluminum garnet) materials behave differently than YAG (yttrium aluminum garnet) materials. In particular, in the case of GYGAG materials, new etching and crystallization reactions with glass occur. When coated with glass and brought to an elevated temperature, the GYGAG is etched away, and grain boundary relief is evident at the glass-ceramic interface. Furthermore, a new crystallite phase begins to form in the glass, which includes lead, silicon, gadolinium, gallium and yttrium oxides. Without being bound by theory, it is believed that transport of gadolinium, yttrium, and gallium to these new growing crystals takes place by diffusion from the etched interfaces through the liquid glass when the system is at an elevated temperature. The measurable presence of gadolinium, gallium, yttrium, and aluminum in the glass itself after being cooled to room temperature supports this supposition. Because of the new reaction between the ceramic and the glass, the bonding process was modified as described herein to eliminate this new crystallization phenomenon and to yield an assembly with optically transparent bond-lines. The initial high temperature glazing process has been changed to a very low temperature vehicle burn-off process, and the glazing takes place for all bonds simultaneously during one very brief heat treatment. Additionally, the HIP process step is modified to suppress dissolution of the GYGAG and prevent formation of these crystallites, which form in the glass bonding layer and interface between the glass and the scintillator material that cause optical scatter.

The described temperature for the hot isostatic pressing are selected such that the crystalline phase in the glass bonding composition is thermodynamically unstable and melts back into the glassy phase. The temperatures eliminate bubbles with compression and eliminate crystallites in the bond by rendering them unstable at the proper temperature.

According to embodiments of the present invention, an optically transparent bond is formed between ceramic materials. The optically transparent bond is substantially free of bubbles, crystallites, or a combination thereof.

Figure 3A:
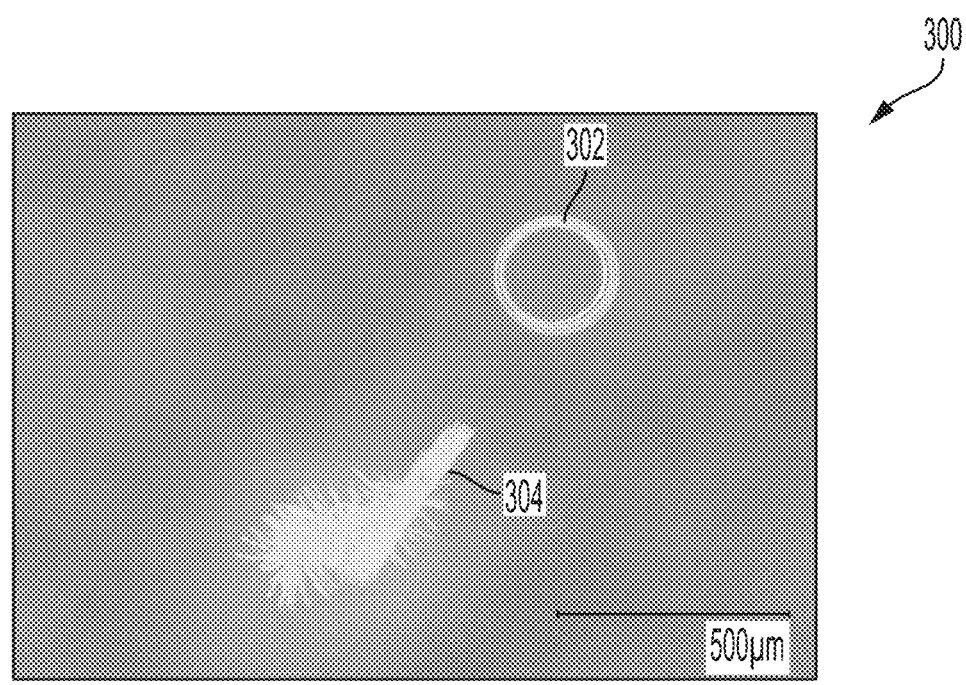
FIG. 3A is a high magnification image of a bubble and a crystallite formed in a glass bond layer.
Figure 3B:
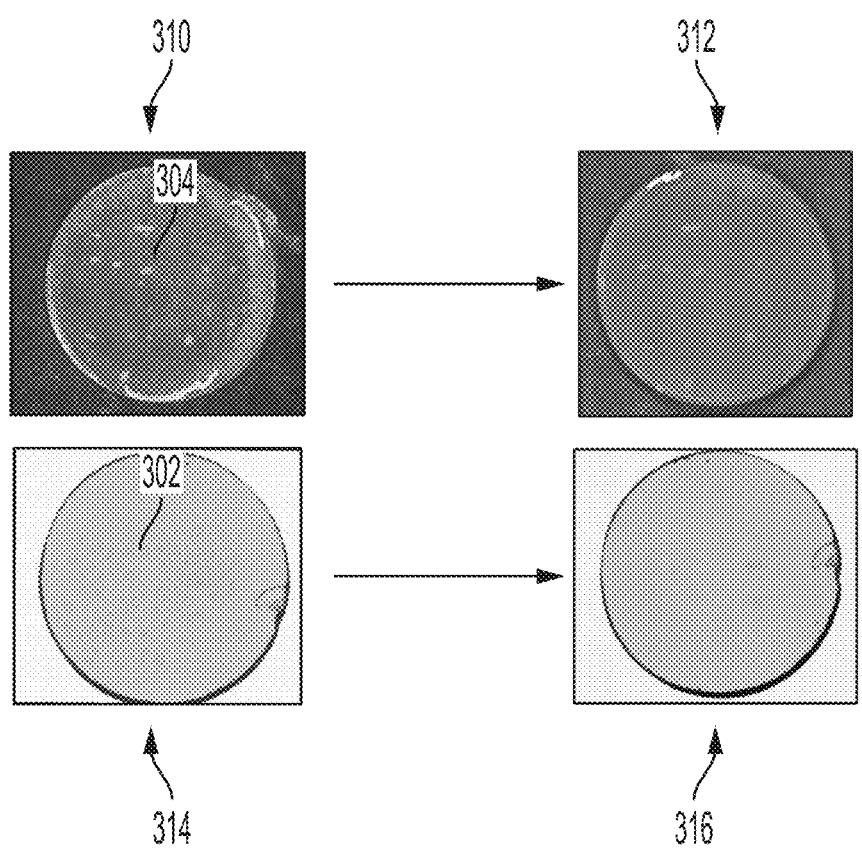
FIG. 3B shows elimination of bubbles and crystallites in a glass bond layer using bonding methods according to embodiments of the present invention.

FIG. 3A is a high magnification image 300 of a bubble 302 and a crystallite 304 formed in a glass bond layer between YAG disks. FIG. 3B shows elimination of bubbles 302 and crystallites 304 in the glass bond layer using bonding methods according to embodiments of the present invention.

After bonding a sufficient number of ceramic tiles to form the final component part, the large panel component can be trimmed and ground to any desired shape and size and optically polished.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method of creating a scintillator element, the method comprising:
   applying a glass composition to at least a first surface of a first optically transparent scintillator material, the glass composition comprising a glass powder and a solvent;
   removing the solvent from the glass composition by applying a first elevated temperature;
   disposing the first material onto a first surface of a second optically transparent scintillator material, wherein the first and second optically transparent scintillator materials both luminesce when excited by ionizing radiation;
   applying a second elevated temperature to the first material and the second material to form an optically transparent bond between the first material and the second material; and
   compressing the first material and the second material under an isostatic pressure.

2. The method of claim 1, wherein the first material comprises a ceramic material.

3. The method of claim 1, wherein the first material comprises a garnet-based material.

4. The method of claim 1, wherein compressing the first material surface and the second material surface is performed for a time of about 30 minutes to about 10 hours.

5. The method of claim 1, wherein the first elevated temperature is about 100 to about 500° C.

6. The method of claim 1, wherein the second elevated temperature is about 400 to about 1000° C.

* * * * *